(12) United States Patent
Turcot

(10) Patent No.: US 8,462,793 B2
(45) Date of Patent: Jun. 11, 2013

(54) SYSTEM FOR STRATEGIC MANAGEMENT AND COMMUNICATION OF DATA IN MACHINE ENVIRONMENTS

(75) Inventor: Keith Albert Turcot, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 936 days.

(21) Appl. No.: 11/807,314

(22) Filed: May 25, 2007

(65) Prior Publication Data

US 2008/0291918 A1 Nov. 27, 2008

(51) Int. Cl.
*H04L 12/28* (2006.01)
*H04L 12/16* (2006.01)
*G06F 15/173* (2006.01)
*H04M 11/04* (2006.01)
*H04W 24/00* (2009.01)

(52) U.S. Cl.
USPC ...... 370/395.42; 370/252; 370/412; 709/239; 709/240; 455/423; 455/404.2

(58) Field of Classification Search
USPC .............. 370/252, 316, 328, 338, 352, 395.4, 370/395.42, 412; 709/203, 217, 219, 229, 709/239, 240; 455/404.2, 405, 423–425, 455/456.1
See application file for complete search history.

(56) References Cited

U.S. PATENT DOCUMENTS

| | | | |
|---|---|---|---|
| 5,850,592 | A | 12/1998 | Ramanathan |
| 5,966,658 | A * | 10/1999 | Kennedy et al. ........... 455/426.1 |
| 6,148,196 | A | 11/2000 | Baumann |
| 6,738,363 | B1 | 5/2004 | Best et al. |
| 6,877,023 | B1 | 4/2005 | Maffeis et al. |
| 7,024,190 | B1 | 4/2006 | Raust et al. |
| 7,380,000 | B2 * | 5/2008 | Yaqub et al. ................. 709/224 |
| 2002/0161921 | A1 * | 10/2002 | Kurakake et al. ............. 709/239 |
| 2002/0198980 | A1 * | 12/2002 | Najafi ........................... 709/224 |
| 2003/0069002 | A1 * | 4/2003 | Hunter et al. ................. 455/404 |
| 2005/0002354 | A1 | 1/2005 | Kelly et al. |
| 2005/0038581 | A1 * | 2/2005 | Kapolka et al. ................. 701/29 |
| 2005/0203673 | A1 * | 9/2005 | El-Hajj et al. .................... 701/1 |
| 2005/0215247 | A1 * | 9/2005 | Kobylarz ................... 455/426.1 |
| 2006/0068777 | A1 | 3/2006 | Sadowsky et al. |
| 2006/0072756 | A1 * | 4/2006 | Leimgruber et al. ......... 380/270 |
| 2006/0079278 | A1 | 4/2006 | Ferguson et al. |
| 2006/0136291 | A1 | 6/2006 | Morita et al. |
| 2007/0038759 | A1 | 2/2007 | Hanson et al. |
| 2007/0136473 | A1 * | 6/2007 | Birchler et al. ............... 709/226 |
| 2007/0156311 | A1 * | 7/2007 | Elcock et al. ................... 701/29 |
| 2007/0210904 | A1 * | 9/2007 | Macielinski et al. ......... 340/439 |
| 2008/0004777 | A1 * | 1/2008 | Quigley ........................... 701/50 |

* cited by examiner

*Primary Examiner* — Michael Thier
*Assistant Examiner* — Redentor Pasia
(74) *Attorney, Agent, or Firm* — Finnegan, Henderson, Farabow, Garrett & Dunner LLP

(57) ABSTRACT

A system for strategic management and communication of data in machine environments includes at least one communication module for communicating data with an off-board system, the communication module being disposed in a machine environment and adapted for use with one or more communication methods. The system also includes a data interpreter communicatively coupled to the at least one communication module. The data interpreter is configured to communicate operation data associated with a machine, the operation data including a plurality of operational aspects associated with at least a portion the machine. The data interpreter prioritizes each of the plurality of operational aspects in a communication queue associated with the data interpreter. The data interpreter is also configured to select a communication method for each of the plurality of operational aspects based on a priority associated with a respective operational aspect and transmit each of the operational aspects to the off-board system via the selected communication method.

25 Claims, 4 Drawing Sheets

SYSTEM FOR STRATEGIC MANAGEMENT AND COMMUNICATION OF DATA IN MACHINE ENVIRONMENTS

TECHNICAL FIELD

The present disclosure relates generally to the collection and dissemination of information in machine environments and, more specifically, to systems and methods for the strategic management and communication of operational data associated with mobile machinery.

BACKGROUND

Remote asset management systems are employed in a variety of today's work environments. Remote asset management systems typically utilize global positioning satellite technology and other sensors to provide information associated with a remotely operated equipment system to a work-site manager. Remote asset management systems may also include data communication systems configured to transmit operational and status information to a data acquisition server, allowing project managers to remotely monitor the productivity and health of equipment systems operating in work environments. Remote management systems may be particularly useful in geographically dispersed work environments that require the management and coordination of multiple resources or equipment systems to complete a task associated with a work environment.

Remote asset management systems may include on-board sensors and GPS receivers with satellite, cellular, and/or other communication equipment for communicating location and health information associated with a remote asset to a data collection server for distribution to a back-end system. This communication equipment may access one or more predetermined subscriber-based networks. Often, the costs for accessing these networks vary depending upon the location of the remote asset. In certain remote areas, the costs associated with accessing a reliable communication network or platform may be expensive. Moreover, in many conventional communication systems, data is transmitted in the order it is received in the communication queue.

Communication problems may arise when the predetermined communication medium becomes slow or disabled, potentially preventing high-value machine data from reaching its destination in a timely manner. For example, communication via satellite may be slow or unavailable if line-of-sight between the mobile transceiver and the satellite is interrupted. These problems may be exacerbated when valuable bandwidth is wasted transmitting low-value data or other data that is not time sensitive. Thus, in order to ensure that critical work-site communication channels are maintained, a system that prioritizes data associated with the machine and work-site and provides one or more communication methods for ensuring that high-value data is transmitted with appropriate urgency may be required.

One way to ensure that communication channels are maintained in work environments is to implement on-board communication systems that support multiple communication methods. As a result, if one communication method should become unavailable, a backup communication method may be used. One such system is provided in U.S. Patent Application Publication No. 2006/0136291 ("the '291 publication") to Morita et al. The '291 publication describes a vehicle managing method for communicating data to a fleet of vehicles via satellite or ground-based communication networks (cellular, DSRC, etc.). The system of the '291 publication may receive operational data (e.g., speed, direction, condition, etc.) from each vehicle in the fleet via an available communication network. The system of the '291 publication may also enable the communication of data between a subscriber to one or more vehicles in the fleet. This data may include entertainment programming (e.g., music or video data associated with music or video data subscriptions), traffic information, directions, or any other type of data that may be requested by an operator of the vehicle.

Although the system of the '291 publication may provide multiple communication methods for transmitting vehicle data between one or more geographically dispersed vehicles and a subscriber, it may still be unreliable. For example, the system of the '291 publication may only be configured to transmit data on a first-in, first-out (FIFO) basis, without regard for the importance of the data to the work-site environment. As a result, should network resources or bandwidth be limited by a service interruption, valuable network bandwidth may be unnecessarily wasted transmitting low-priority data (e.g., entertainment data such as music, video, etc.) instead of high-priority information (health data, productivity data, etc.) that may be critical to the successful operation of the work-site.

In certain situations, the system of the '291 publication may be unnecessarily expensive. For example, should one or more relatively inexpensive transmission mediums (e.g., broadcast, WLAN, etc.) lose service, the system of the '291 publication may utilize more expensive transmission methods (e.g., cellular, DSRC) to transmit the required data. Because the required data is not prioritized, however, bandwidth and airtime associated with the more expensive communication methods may be wasted sending non-critical or irrelevant information over the network, driving up costs associated with data communication associated with mobile assets.

The presently disclosed system for strategic management and communication of data in machine environments is directed toward overcoming one or more of the problems set forth above.

SUMMARY OF THE INVENTION

In accordance with one aspect, the present disclosure is directed toward a system for strategic management and communication of data in machine environments. The system may include at least one communication module for communicating data with an off-board system, the communication module being disposed in a machine environment and adapted for use with one or more communication methods. The system may also include a data interpreter communicatively coupled to the at least one communication module. The data interpreter may be configured to receive operation data associated with a machine, the operation data including a plurality of operational aspects associated with at least a portion the machine. The data interpreter may prioritize each of the plurality of operational aspects in a communication queue associated with the data interpreter. The data interpreter may also be configured to select a communication method for each of the plurality of operational aspects based on a priority associated with a respective operational aspect and transmit each of the operational aspects to the off-board system via the selected communication method.

According to another aspect, the present disclosure is directed toward a method for data communication between one or more geographically dispersed assets and a project management system. The method may include receiving, in a data interpreter, operation data associated with a remote asset operating in a project environment, the operation data including a plurality of operational aspects associated with the remote asset. A priority may be assigned to each of the plurality of operational aspects, with each of the plurality of operational aspects being arranged in a communication queue based on the assigned priority. A communication method may be selected for each of the plurality of operational aspects in the communication queue and operation data may be transmitted from the communication queue via the selected communication methods.

In accordance with yet another aspect, the present disclosure is directed toward a method for data communication between one or more geographically dispersed assets and a project management system. The method may include monitoring operation data associated with a remote asset operating in a project environment and prioritizing the monitored operation data. A communication queue may be established for communicating the operation data between a remote asset and a project management system, the communication queue being configured to arrange the operation data for communication based on the priority associated with the operation data. The method may also include selecting a communication method for transmitting the operation data in the communication queue such that operation data is queued for transmission based on one or more of reliability and cost of available communication methods. Accordingly, operation data associated with the communication queue may be transmitted via a selected communication method.

DETAILED DESCRIPTION

Figure 1A:
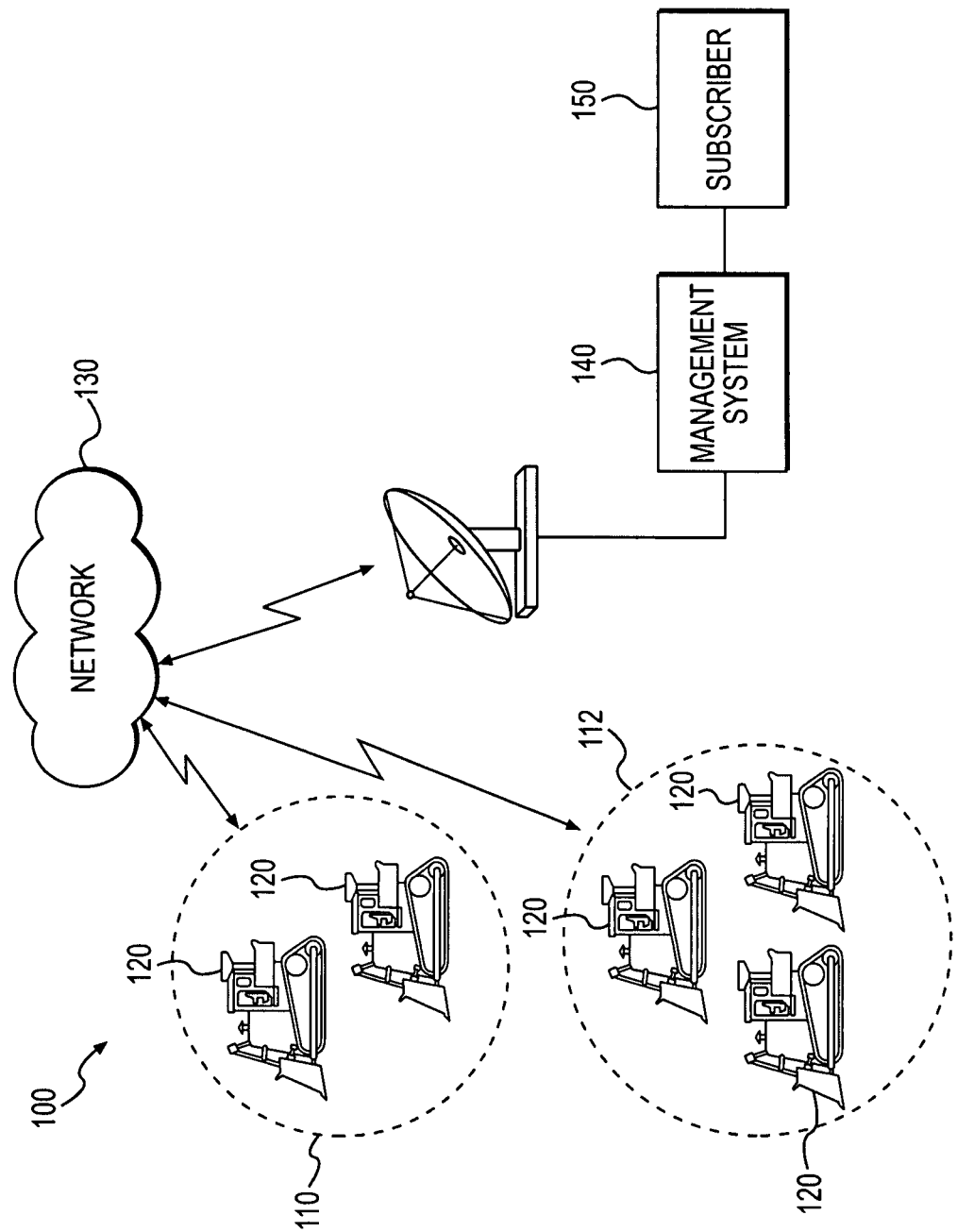
FIG. 1A illustrates an exemplary project environment consistent with the disclosed embodiments.

FIG. 1A illustrates an exemplary project environment 100 consistent with certain disclosed embodiments. Project environment 100 may include one or more components that perform individual tasks that contribute to a machine environment task, such as mining, construction, transportation, agriculture, manufacturing, or any other type of task associated with other types of industries. For example, project environment 100 may include one or more machines 120 coupled to a management system 140 via one or more communication networks 130. The project environment 100 may be configured to monitor, collect, control, and/or filter information associated with an operation of one or more machines 120 and distribute the information to one or more back-end systems, such as management system 140 and/or project subscribers 150. It is contemplated that additional and/or different components than those listed above may be included in project environment 100.

Machines 120 may each be a fixed or mobile machine configured to perform an operation associated with project environment 100. Thus, machine, as the term is used herein, refers to a fixed or mobile machine that performs some type of operation associated with a particular industry, such as mining, construction, farming, etc. and operates between or within project environments (e.g., construction site, mine site, power plants, etc.) Furthermore, machine 120 may be used to refer to any remote asset operating within or associated with project environment 100. A non-limiting example of a fixed machine includes an engine system operating in a plant, a material conveyer, or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. A machine may be driven by a combustion engine or an electric motor. The types of machines listed above are exemplary and not intended to be limiting. It is contemplated that project environment 100 may implement any type of machine. Accordingly, although FIG. 1A illustrates machines 120 as mobile earth-moving machines, each machine 120 may be any type of machine operable to perform a particular function within project environment 100. Furthermore, it is contemplated that machines 120 may include a first set of machines 110 and a second set of machines 112 for associating the operations of particular machines to groups of machines. Furthermore, it is also contemplated that first and second sets of machines may be located in separate work sites located remotely from each other, and with management system 140.

Figure 1B:
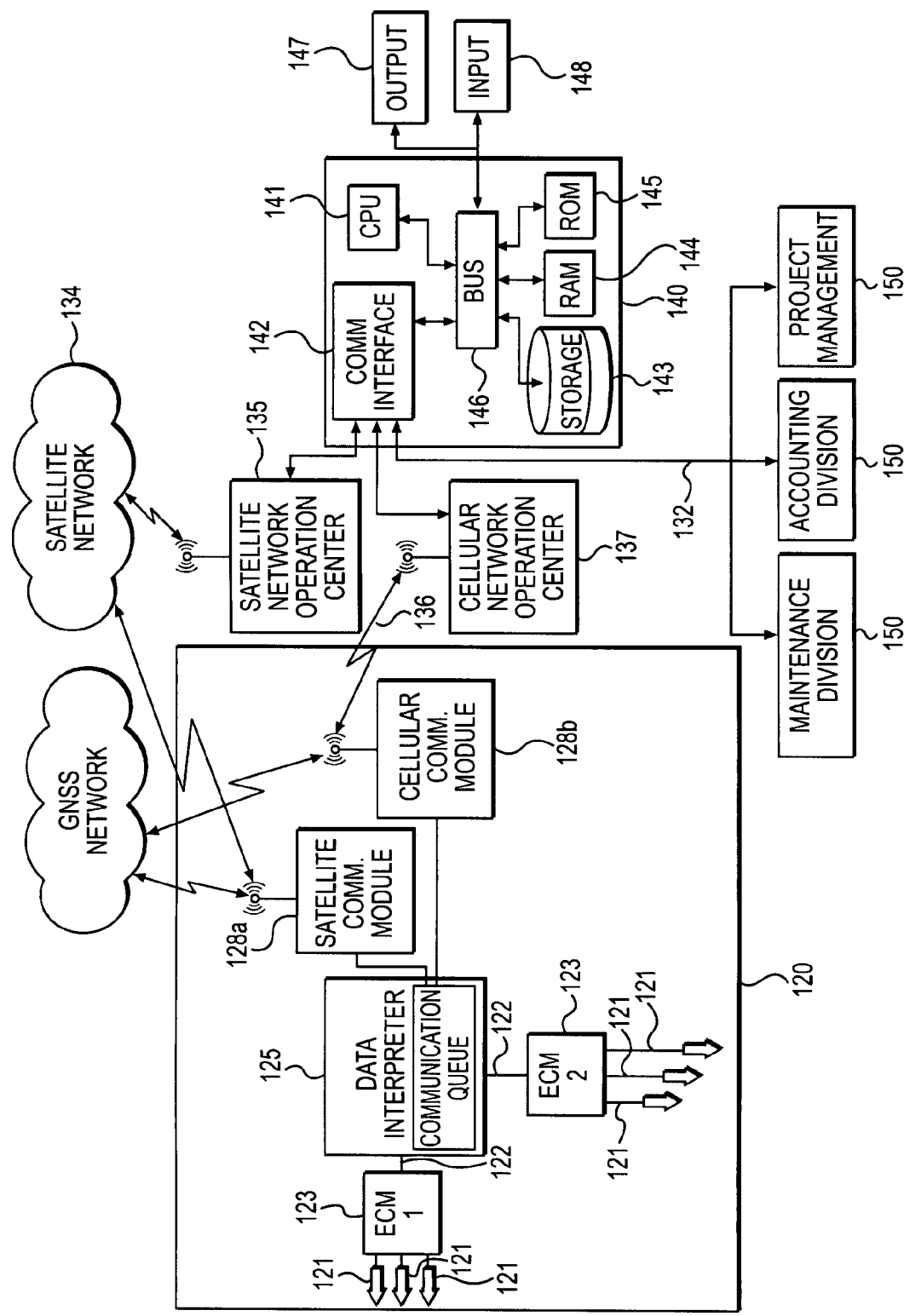
FIG. 1B provides a schematic illustrating certain components associated with the project environment of FIG. 1A.

In one embodiment, each machine 120 may include on-board data collection, control, and communication equipment to monitor, collect, and/or transmit information associated with an operation of one or more components of machine 120. As shown in FIG. 1B, machine 120 may include, among other things, one or more monitoring devices 121 (e.g., sensors or other data collectors); one or more electronic control modules 123; a data interpreter 125 coupled to one or more electronic control modules 123 and/or monitoring devices 121 via communication lines 122; one or more communication modules 128a, b; and/or any other component that may be used for monitoring, collecting, and communicating information associated with the operation of machine 120. Each machine 120 may also be configured to exchange information with off-board systems, such as a management system 140, a project subscriber 150, or any other back-end communication system. The components described above are exemplary and not intended to be limiting. Accordingly, the disclosed embodiments contemplate each machine 120 including additional and/or different components than those listed above.

Data interpreter 125 may include one or more components for storing, analyzing, controlling, and organizing operation data associated with machine 120. Data interpreter 125 may include, for example, a communication interface (not shown) for collecting operation data from one or more monitoring devices 121 and/or ECMs 123; a processor (not shown) for executing analysis and communication processes; one or more memory devices (not shown) for storing the operation data and priority/cost routing tables; and/or a communication queue for coordinating the communication from machine 120 to one or more off-board systems. It is contemplated that data interpreter 125 may include additional, fewer, and/or different components than those listed above. Operation of data interpreter 125 will be described in greater detail below.

Data interpreter 125 may be operable to receive, collect, and/or package operation data associated with machine 120. Operation data, as the term is used herein, refers to any type of data indicative of at least one operational aspect associated with one or more machines 120 or any of its constituent components or subsystems. Non-limiting examples of operation data may include, for example, health information such as fuel level, oil pressure, engine temperate, coolant flow rate, coolant temperature, tire pressure, or any other data indicative of the health of one or more components or subsystems of machine 120. Alternatively and/or additionally, operation data may include status information such as engine power status (e.g., engine running, idle, off), engine hours, engine speed, machine speed, location, or any other data indicative of a status of machine 120. Optionally, operation data may also include certain productivity information such as, task progress information, load vs. capacity ratio, shift duration, haul statistics (weight, payload, etc.), fuel efficiency, or any other data indicative of a productivity of machine 120. Alternatively and/or additionally, operation data may include control signals for controlling one or more aspects or components of machine 120. Data interpreter 125 may receive/collect operational information associated with an operation of machine 120 from one or more monitoring devices 121 and/or ECMs 123 during the execution of an assigned task.

Data interpreter 125 may be configured to analyze the collected data and prioritize the collected data based on how critical the data is to the operation of the machine and/or the productivity of project environment 100. For example, data interpreter 125 may include data analysis software and/or hardware logic that analyzes the collected data with respect to predetermined project design requirements or threshold levels to determine if the machine is operating appropriately. Based on the analysis, data interpreter 125 may be configured to prioritize the collected data. For instance, if a particular operational aspect deviates from a predetermined threshold level, data interpreter 125 may flag the operational aspect, identifying it as high-priority. Alternatively and/or additionally, certain operation data may always be considered high-priority such as safety information, warning signals, health information, etc. In certain project environments, where coordination of machine locations and schedules is critical to efficient operation of the environment, data indicative of machine location may always be identified as high-priority. It is contemplated that project or work-site managers may designate or prioritize any type of information as high-value.

Data interpreter 125 may be configured to identify one or more communication methods and/or networks available to machine 120. For example, data interpreter 125 may automatically detect one or more communication networks available to the machine by transmitting a network request in multiple formats and communication methods compatible with the on-board communication capabilities of the machine. Data interpreter 125 may determine the availability and reliability of each respective network based on the strength of a signal received in response to the network request. Alternatively and/or additionally, data interpreter 125 may periodically request a list of available communication methods or services from management system 140, including cost and reliability data associated with each communication methods or network from a management system 140.

Data interpreter 125 may be configured to coordinate the transmission of operation data from the machine to one or more off-board systems, such as management system 140. As noted above, data interpreter 125 may include a communication queue, in which the prioritized operation data is queued for data transmission via a selected communication method and/or network based on one or more of the priority of the data, the reliability of the available communication methods, and/or the cost associated with each of the communication methods and/or networks. For example, data interpreter 125 may queue high-priority data for communication before low-priority data, using one of the more reliable communication methods available. Similarly, low priority data may be queued for communication over one or more less expensive communication methods.

Each of machines 120 may include one or more communication modules 128*a, b*. For example, machines 120 may include a satellite communication module 128*a* that may be adapted to facilitate communication between machine 120 and an off-board system (such as a management system 140) via a satellite communication network 134. Satellite communication module 128*a* may be configured to operate using one or more satellite subscriber networks such as, LEO or GeoSat services. Alternatively, satellite communication module(s) 128*a* may be configured to communicate with one or more public or governmental satellite services, such as GPS or Glonass. Alternatively and/or additionally, machines 120 may include cellular communication modules 128*b* that may be configured to facilitate wireless communication between machine 120 and an off-board system via one or more available cellular subscriber network(s) 136. Machine 120 may include additional, fewer, and/or different communication modules than those listed above. For example, machines 120 may include a WiFi or WiMax communication module(s) that communicates data via a wireless local area network mechanism. Machine 120 may also include a point-to-point wireless communication module(s) that communicates with other point-to-point equipped systems. Furthermore, satellite, cellular, WiFi, point-to-point, and/or other communication methods may all be supported by a single communication module, thereby limiting the amount of equipment required to support multiple communication methods. Machines 120 may be adapted to support multiple communication methods or services such as satellite, cellular, short message service (SMS), text messaging, paging, or any other type of communication services suitable for remote communication of data in asset management environments. Although FIG. 1B depicts machine 120 as including satellite and cellular communication modules and associated networks, the number and type of communication modules and supporting network infrastructure shown is exemplary only and not intended to be limiting. Accordingly, communication modules 128*a, b* may embody any suitable communication module for supporting appropriate communication services available to machine 120.

Communication network 130 may include any network that provides two-way communication between machines 120 and an off-board system (e.g., management system 140). For example, communication network 130 may communicatively couple machines 120 to management system 140 across a wireless networking platform such as, for example, a satellite communication system, a cellular communication system, or any other platform for communicating data with one or more geographically dispersed assets (e.g., Bluetooth, microwave, point-to-point wireless, point-to-multipoint wireless, multipoint-to-multipoint wireless.) Although communication network 130 is illustrated as satellite- and/or cellular-based wireless communication networks it is contemplated that communication network 130 may also include or embody wireline networks such as, for example, Ethernet, fiber optic, waveguide, or any other type of wired communication network. It is also contemplated that communication network may support additional communication media or communication methods such as smartcard technology, manual data transport methods (sneakernet), or any suitable means for transporting data between machine 120 and off-board systems.

Communication network 130 may also include any necessary infrastructure to support message routing and network operations. For example, communication network 130 may include various hardware and software support systems and equipment that facilitates operations of one or more communication services.

Management system 140 may be any computing system configured to receive, transmit, analyze, and distribute operational data with one or more machines 120. Management system 140 may be communicatively coupled to one or more machines 120 via communication network 130. Management system 140 may embody a centralized server and/or database adapted to collect and disseminate operation data associated with each of machines 120. Once collected, management system 140 may categorize and/or filter the operation data according to data type, priority, etc. In the case of critical or high-priority data, management system 140 may be configured to transmit "emergency" or "critical" messages to one or more work site personnel (e.g., repair technician, project managers, etc.) indicating that a remote asset has experienced a critical event. For example, should a machine become disabled, enter an unauthorized work area, or experience a critical engine operation condition, management system 140 may transmit a message (text message, email, page, etc.) to a project manager, job-site foreman, shift manager, machine operator, and/or repair technician, indicating a potential problem with the machine. Management system 140 may also provide a means to update the communications cost/priority table for later communications to the machines 120.

Management system 140 may also communicate with other systems (e.g., project subscriber 150, one or more sitemanagers (not shown), etc.) via a communication link (not shown). For example, communication link may include one or more data links that connect management system 140 to another system (e.g., project subscribers 150 associated with a machine maintenance division, accounting division, or project management division) as part of a point-to-point or point-to-multipoint network. Alternatively and/or additionally, the communication link may include a common access communication method, such as the Internet, a private intranet, a corporate workgroup, or any other communication method. The communication link may include electrical wires, twisted pair cables, optical fiber cables, wireless links (e.g., infrared links, Bluetooth connections, satellite communication links, etc.), or any other media appropriate for transmitting data. Further, the communication link may be configured with hardware and/or software components that enable data to be transmitted using an analog format, a digital format, a combination thereof, or any other form of data communication.

In one embodiment, management system 140 may include hardware and/or software components that perform processes consistent with certain disclosed embodiments. For example, as illustrated in FIG. 1B, management system 140 may include a central processing unit (CPU) 141, a communication interface 142, one or more computer-readable memory devices, including storage devices 143, a random access memory (RAM) module 144, a read-only memory (ROM) module 145, a display device 147, and/or an input device 148. The components described above are exemplary and not intended to be limiting. Furthermore, it is contemplated that management system 140 may include alternative and/or additional components than those listed such as, for example, one or more software programs including instructions for performing process steps when executed by CPU 141.

CPU 141 may be one or more processors that execute instructions and process data to perform one or more processes consistent with certain disclosed embodiments. For instance, CPU 141 may execute software that enables management system 140 to request and/or receive operation data from data interpreter 125 of machines 120. CPU 141 may also execute software that stores collected operation data in storage device 143. In addition, CPU 141 may execute software that enables management system 140 to analyze operation data collected from one or more machines 120, modify one or more project specifications of the project environment 100, and/or provide customized project status reports, including recommendations for modifications to project specifications and/or operational instructions for executing the project. A project specification may include one or more characteristics associated with the execution of a machine project such as, for example, a project schedule for completion of the machine project, a productivity schedule for each respective machine operating in project environment 100, a project productivity rate (e.g., percentage of project completed per month), a project budget, a productivity quota for machine 120, maintenance schedules, hours of operation for the machine and/or job-site, an assignment for a particular machine, a job-site inventory, and any other type of characteristic associated with project management. Furthermore, a project specification may include a guideline that, when used as a project benchmark, may assist in the appropriate execution of a project performed within project environment 100. These benchmarks may include incremental completion milestones, budget forecasts, and any other type of performance and/or operation benchmark.

CPU 141 may be connected to a common information bus 146 that may be configured to provide a communication medium between one or more components associated with management system 140. For example, common information bus 146 may include one or more components for communicating information to a plurality of devices. CPU 141 may execute sequences of computer program instructions stored in computer-readable medium devices such as, for example, a storage device 143, RAM 144, and/or ROM 145 to perform methods consistent with certain disclosed embodiments, as will be described below.

Communication interface 142 may include one or more elements configured for communicating data between management system 140 and one or more data interpreters 125 via communication network 130. For example, communication interface 142 may include one or more modulators, demodulators, multiplexers, demultiplexers, network communication devices, wireless devices, antennas, modems, and any other type of device configured to provide data communication between management system 140 and remote systems or components.

One or more computer-readable medium devices may include one or more storage devices 143, a RAM 144, ROM 145, and/or any other magnetic, electronic, or optical data computer-readable medium devices configured to store information, instructions, and/or program code used by CPU 141 of management system 140. Storage devices 143 may include magnetic hard-drives, optical disc drives, floppy drives, or any other such information storing device. A random access memory (RAM) device 144 may include any dynamic storage device for storing information and instructions by CPU 141. RAM 144 also may be used for storing temporary variables or other intermediate information during execution of instructions to be executed by CPU 141. During operation, some or all portions of an operating system (not shown) may be loaded into RAM 144. In addition, a read only memory (ROM) device 145 may include any static storage device for storing information and instructions by CPU 141.

Management system 140 may include one or more input devices configured to receive one or more project specifications (e.g., project schedule, job-site inventory, project budget, individual machine tasks, etc.) indicative of a project to be performed by a plurality of machines from one or more users associated with project environment 100. For example, project management system may include a console with integrated keyboard and mouse to allow a user of project management system (e.g., customer, client, etc.) to input project specifications corresponding to a particular project to be performed as part of project environment 100. Management system 140 may store the project specifications in storage device 143 for future analysis and/or modification. The components listed above are exemplary only and not intended to be limiting. Accordingly, additional, fewer, and/or different input devices may be included with management system 140.

Management system 140 may be coupled to on-board data collection and communication equipment to monitor, collect, and/or transmit information associated with an operation of one or more components of machine 120. In one embodiment, management system 140 may be coupled to one or more data interpreters 125 on respective machines 120 via communication modules 128a, 128b. Accordingly, management system 140 may collect operation data from one or more monitoring devices 121, such as sensors, electronic control modules 123, etc. (not shown), and/or any other such components for monitoring, collecting, and communicating information associated with the operation of a respective machine 120. Management system 140 may also be configured to transmit information to machine 120 via communication network 130.

Management system 140 may include one or more components that analyze operation data from machines 120 with respect to predefined design specifications stored in storage device 143. For example, in addition to CPU 141, management system 140 may be configured with on-board logic circuitry that analyzes operation data received from machines 120. Predefined design specifications include one or more data indicative of an appropriate operation of a machine 120 or its constituent components. For example, predefined design specifications may include, for example, benchmark operational ranges, stress-strain thresholds, mechanical force limits, fuel economy, temperature ranges, pressure ranges, load limits, or any other such predefined specification benchmarking the performance of a machine during normal operations. Moreover, each of the predefined design specifications may be associated with one or more components of machine 120 such as, for example, a combustion engine, a motor, a transmission, a fluid cooling system, a generator, a cooling tank, a lubricating fluid, or any other component of machine 120.

Management system 140 may also be configured to compare the received operation data associated with a machine 120 to one or more predefined design specifications and determine whether the received operation data is operating within a predetermined range. For example, management system 140 may receive operation data from, among other things, an electric motor associated with machine 120. The operation data may include data indicative of a field current through a stator winding of the motor. Management system 140 may compare the received field current data to predefined design specifications related to the field current of the motor to determine whether the received field current conforms to the design tolerances associated with the predefined design specifications. Although this example illustrates the received operation data as being associated with one component, it is contemplated that received operation data may include any data indicative of an operation of machine 120 or any of its constituent components. Furthermore, management system 140 may be configured to analyze operation data associated with any number of components of machine 120, and may perform analyses of these components in series, parallel, simultaneously, sequentially, or any combination thereof.

Project subscriber 150 may include a computer system that is configured to receive data from management system 140 in a manner consistent with the disclosed embodiments. For example, project subscriber 150 may include one or more computer terminals operated by respective users. Alternatively and/or additionally, project subscriber 150 may include personal data assistant systems (PDA), wireless communication devices (e.g., pagers, phones, etc.), notebook computers, diagnostic computer systems, data analyzers, or any other such computing devices configured to receive and process information, such as operation data. In one embodiment, project subscriber 150 may be associated with one or more sections of a business entity associated with managing a remote project site within project environment 100. For instance, project subscriber 150 may be associated with a particular division of a business entity associated with project environment 100, such as a project management division, an operations division, a maintenance and repair division, a procurement division, a human resource division, and/or any other business entity that may be associated with project environment 100. In another embodiment, project subscriber 150 may be associated with a business entity that is affiliated with one or more sets of machines 120, such as first set 110. For example, project subscriber 150 may be associated with a site-manager that controls the operation and productivity of the first set of machines 110. Alternatively and/or additionally, different project entities may be associated with different business entities and/or machines 120. Accordingly, the above descriptions are exemplary and not intended to be limiting. The disclosed embodiments contemplate any correlation (or none at all) between one or more business entities, and/or sections thereof, and the components of project environment 100.

Project subscriber 150 may be associated with a business entity affiliated with project environment 100 and may be configured to communicate with management system 140. In one embodiment, project subscriber 150 may transmit and receive operation data to and from management system 140 associated with one or more machines 120 operating within project environment 100. For example, project subscriber 150 may be an on-site maintenance and repair division that receives operation data associated with one or more machines 120 or a set of machines 110 from management system 140.

Project subscriber 150 may be configured to analyze the received operation data to determine what, if any, action needs to be taken on a particular machine 120 or component of machine 120 (e.g., repair, replacement, etc.) In addition, should operation data received from a machine 120 indicate that a component of the machine requires replacement, project subscriber 150 may determine the appropriate action (e.g., replacement of the damaged component, scheduling of a substitute machine, etc.) that may be required to complete the project according to one or more project specifications (e.g., by the project completion deadline). Alternatively, project subscriber 150 may determine, upon analysis, that the project specifications cannot be met under the current operating conditions of project environment 100. Project subscriber 150 may recommend that the "current" project specifications be modified, to reflect the "real-time" operation data associated with project environment 100.

Processes and methods consistent with the disclosed embodiments provide organizations that rely on communication of data with remote assets operating in a geographically dispersed work environment with a system for prioritizing operation data and selecting a communication method based the priority of the data. Accordingly, low-priority data (i.e., non-critical data) may be queued for data communication via the least expensive communication method available. In some cases, low-priority data may be scheduled for data communication during off-peak hours, when communication prices may be significantly lower than during peak hours. Similarly, high-priority data (e.g., warning signals or other critical data) may be queued for data communication via one or more high reliability communication methods.

Figure 2:
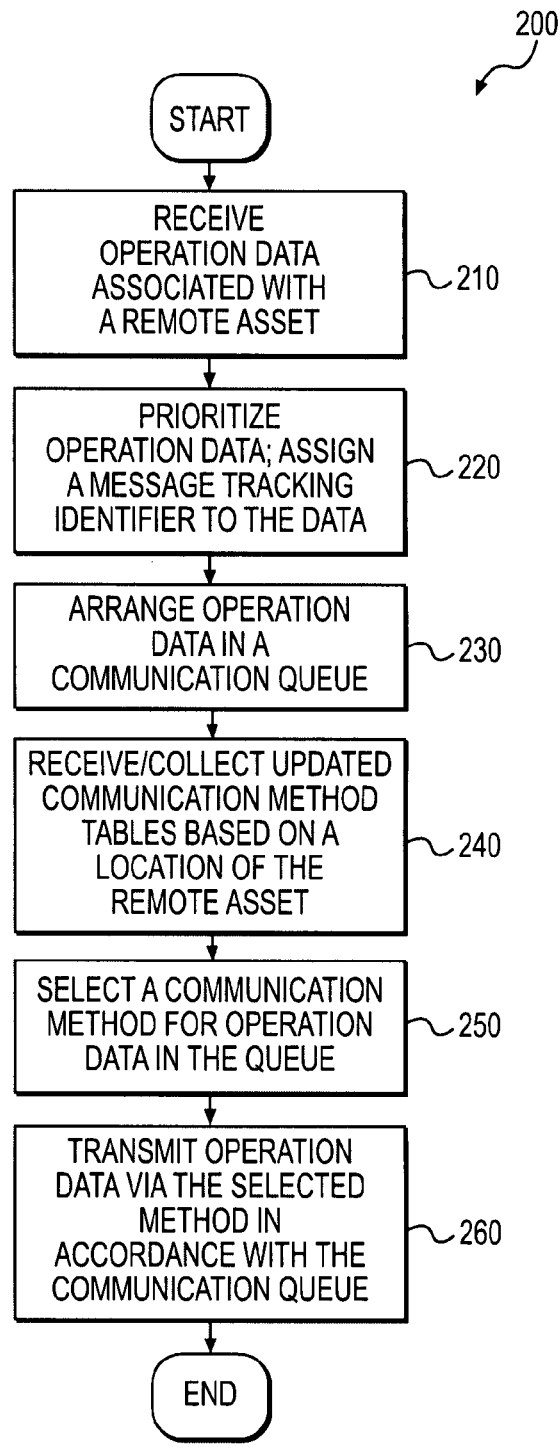
FIG. 2 provides a flowchart depicting a method for data communication between one or more geographically dispersed assets and a project management system in accordance with one embodiment.

FIG. 2 provides a flowchart 200 depicting an exemplary method for strategic management and communication of operation data between or within geographically dispersed project environments. According to an exemplary embodiment, the method illustrated in FIG. 2 may be performed by data interpreter 125, in cooperation with one or more data monitoring devices 121 and communication modules 128a, 128b. As illustrated in FIG. 2, data interpreter 125 may receive/collect operation data associated with components and subsystems of a machine corresponding therewith (Step 210). As explained, data interpreter 125 may be in data communication with one or more monitoring devices 121 and/or ECMs 123. Data interpreter 125 may be configured to receive operation data from monitoring devices 121 and/or ECMs 123, either automatically and/or in response to a data query sent between monitoring devices 121 or ECMs 123 and data interpreter 125.

Upon receiving operation data, data interpreter 125 may prioritize the operation data (Step 220). According to one embodiment, data interpreter 125 may compare each operational aspect associated with the operation data with a predetermined threshold associated with the respective operational aspect and prioritizes the operation data based on the comparison. For example, data interpreter 125 may compare a monitored engine temperature with a predetermined "normal" temperature range specified by the manufacturer. If the engine temperature conforms to predetermined threshold range, the data may be flagged as low-priority. If, however, the engine temperature is inconsistent with the predetermined threshold range, which may be indicative of a potentially critical engine overheat condition, the data may be flagged as high-priority. It is contemplated that certain operational aspects may be identified as high-priority, regardless of the monitored value of the aspect. For example, in certain project environments, particularly those involving coordination of delivery schedules for multiple machines or those where asset loss has been particularly problematic, location data associated with the machine may be established as high-priority.

In addition to prioritizing the operation data, data interpreter 125 may tag each data package with a tracking identification code. By tagging each data package with a unique tracking identifier, data communicated between machines 120 and management system 140 may be tracked to verify the successful transmission of the data. Furthermore, in some cases, high-value operation data this queued for transmission via multiple communication methods to ensure that the data arrives at its destination as soon as possible. By providing tracking numbers for data packages, duplicate, backup, or redundant data messages may be discarded or eliminated upon successful receipt of the first instance of the message.

Data interpreter 125 may be configured to establish, maintain, and arrange operation data in a communication queue (Step 230). For example, data interpreter 125 may establish an order and schedule for the communication of data from machine 120 to one or more off-board systems. This order and schedule may be based on the established priority of each operational aspect. For instance, data may be arranged in the communication queue such that high-priority data is queued for transmission before low-priority data. According to one embodiment, data interpreter 125 may be adapted to establish one or more communication queues, each queue corresponding to a particular priority of operation data or communications channel. As such, one or more communication queues may be dedicated exclusively to the transmission of high priority data. Accordingly, certain communication resources associated with machine 120 may be dedicated exclusively to transmitting high-priority operation data to one or more off-board systems.

Data interpreter 125 may receive/collect updated communication service or method data tables based on the location of machine 125 (Step 240). For example, data interpreter 125 may periodically provide updated location data to management system 140. In response, management system 140 may search for rate and reliability information associated with any available communication services that are compatible with machine 120. Management system 140 may create a data table that includes the updated rate and reliability data, and provide the table to data interpreter 125. Data interpreter 125 may use the updated data when transmitting data and/or selecting a communication service for a particular data package.

Data interpreter 125 may be configured to select a communication method for communicating operation data in the data queue (Step 250). For example, data interpreter 125 may select a first communication method and communications module for high-priority data, based on the reliability of one or more available communication methods. According to one embodiment, communication modules 128a, 128b may detect one or more available communication methods in the geographical region of the machine. Data interpreter 125 may identify the communication methods with the highest available signal strength, and schedule high-priority operation data for communication via the identified communication methods. According to another embodiment, data interpreter 125 may periodically collect a list of available communication methods from an off-board system. Data interpreter 125 may select the communication method from the list based on the reliability data contained in the list.

Similarly, data interpreter 125 may select a second communication method for low-priority data based on the cost of one or more available communication methods. Accordingly, low-priority data may be queued for transmission via one or more low-cost communication methods. In some cases, low-priority data may be scheduled for transmission during off-peak hours, when communication costs may be less expensive than during peak hours.

Upon selecting a communication method, the data may be transmitted via the selected communication methods in accordance with the communication queue (Step 260). For example, one or more communication modules 128a, 128b may transmit data from the communication queue according to the order and schedule established by data interpreter 125. Accordingly, satellite communication module 128a may transmit those operational aspects that data interpreter 125 scheduled for communication via the satellite communication method. Similarly, cellular communication module 128b may transmit those operational aspects that are scheduled for data communication via a cellular network communication method.

Figure 3:
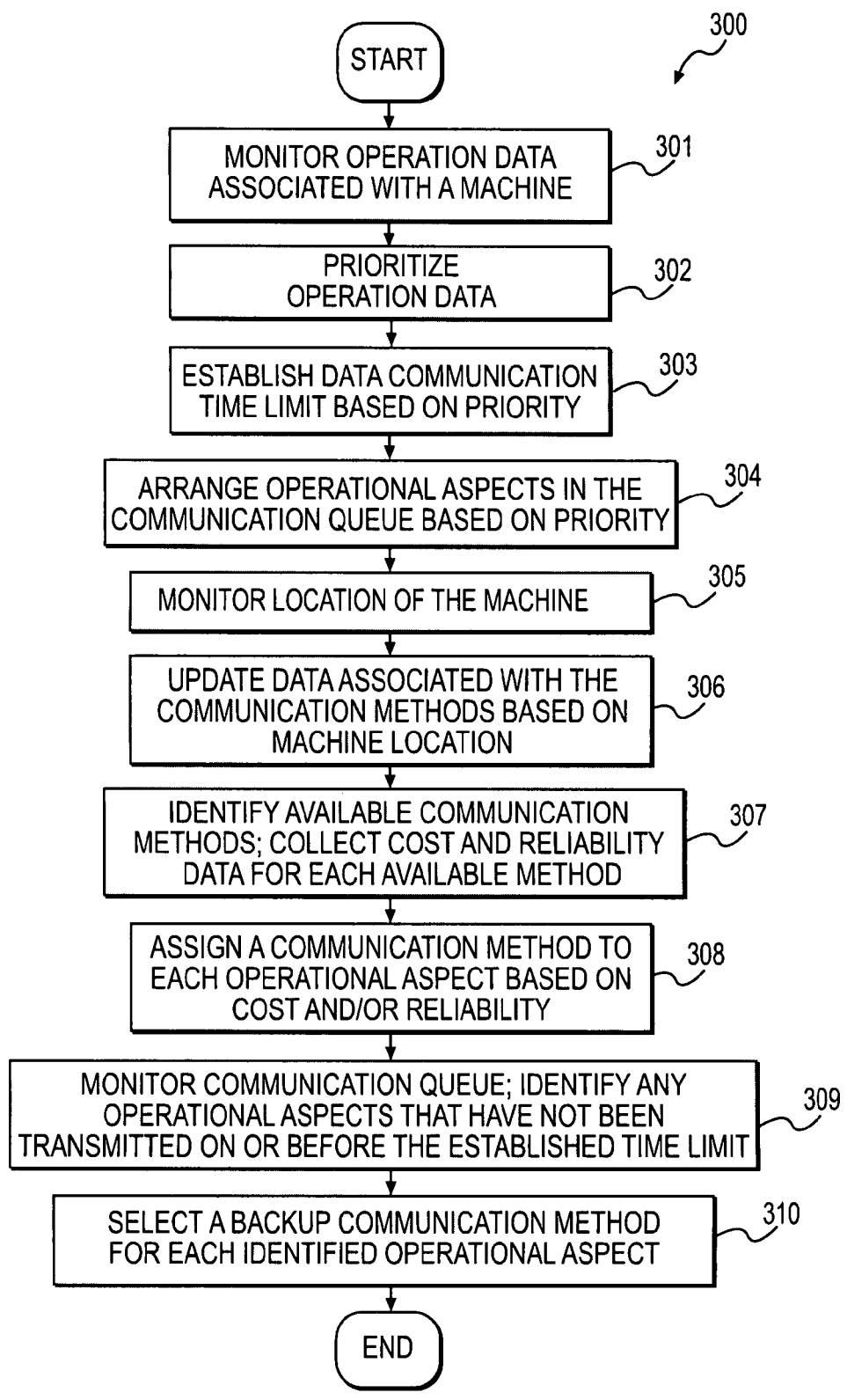
FIG. 3 provides a flowchart depicting a method for data communication between one or more geographically dispersed assets and an off-board system in accordance with another embodiment.

FIG. 3 illustrates a flowchart 300 depicting an exemplary method for transmitting data associated with remote assets in project environments such that the most cost-effective transmission communication methods is selected, without compromising the time-sensitivity of high-priority data. As illustrated in FIG. 3, data interpreter 125 may monitor operation data associated with a machine operating in a machine environment (Step 301).

Data interpreter 125 may compare operational aspects associated with the monitored operation data with predetermined threshold ranges and prioritize each operational aspect prior to data transmission (Step 302). Data interpreter 125 may then establish a data communication time limit for each operational aspect based on the priority assigned to the operational aspect (Step 303). According to one embodiment, the data communication time limit may correspond to a period of time that a particular operational aspect can remain in the communication queue. Thus, data interpreter 125 may assign a first time limit that is relatively short (e.g., 1 minute, 5 minutes, 30 minutes, etc.) to high-priority data, while assigning a second time limit that is larger than the first time limit (e.g., 2 hours, 4 hours, 1-day, etc.) This may ensure that the high-priority operation data may be transmitted more quickly than low-priority operation data.

Data interpreter 125 may arrange operational aspects in the communication queue based on priority (Step 304), such that the higher-priority data is queued for transmission before lower-priority data. Alternatively and/or additionally, data interpreter 125 may arrange high-priority operational aspects in the communication queue based on the actual time that each of the operational aspects has been in the communication queue. For instance, among the operational aspects queued as high-priority, data interpreter 125 may arrange for the transmission of the "oldest" operational aspects (i.e., those aspects that have been in the communication queue for the largest amount of time) before the "newer" operational aspects. It is contemplated that the arrangement of the operational aspects in the communication queue is a "real-time" process executed by data interpreter 125 upon receipt of the operation data. Accordingly, the communication queue may adjust the order of the operational aspects upon receipt of new operation data. Thus, highly critical messages (i.e., machine failure) may be queued for transmission before any aspects with lower degrees of criticality, including those aspects that have been in the communication queue beyond their assigned time limit.

According to one embodiment, management system 140 may monitor location data associated with machine 120 (Step 305) and update data associated with the available communication methods and/or services, based on changes in the location of machine 125 (Step 306). Those skilled in the art will recognize that pricing and reliability associated with certain communication services may change depending upon the location of machine 120. For example, an organization with substantial operations in a particular zone or location may negotiate a communication service contract with a particular service provider for reduced rates for a particular service region. While machine 120 is operated within the service area covered by the agreement, reduced rates may apply. Accordingly, management system 120 may provide updated pricing information to data interpreter 125 reflecting the cost and reliability structure associated with service providers in the area, including the contract rates associated with any preferred service providers. Furthermore, management system 140 may monitor communication service rates and provide updated rate, availability, and reliability data to data interpreter 125. Data interpreter 125 may, in turn, select communication methods and services based on the latest rate and reliability information for the particular location of machine 120. It is contemplated that data may be updated periodically or in response to a predetermined event (e.g., location change, status change, etc.), which potentially may have an impact on the rate and reliability structure of available communication services.

Once the operational aspects have been queued for transmission, one or more communication methods available to the machine may be identified (Step 307). According to one embodiment, one or more of communication methods 128a, 128b may be configured to broadcast network availability queries to detect compatible and available communication networks that can be accessed by machine 120. According to another embodiment, management system 140 may be configured to monitor the availability, reliability, and cost of communication networks available to each machine, based on a location of the machine. This data may be uploaded by management system 140 to data interpreter 125, or may be downloaded by data interpreter 125 periodically (e.g., hourly, daily, or when a machine's position has relocated to another portion of the project environment).

Data interpreter 125 may be configured to assign a communication method to each operational aspect in the communication queue based on one or more of cost and/or reliability of the available communication networks (Step 308). Initially, data interpreter may assign the least expensive communication method to each operational aspect in the communication queue. Subsequently, data interpreter 125 may monitor the time that the operational aspect remains in the communication queue (Step 309). If the operational aspect has not been transmitted by the corresponding time limit, data interpreter 125 may select another communication method for the operational aspect (Step 310). Data interpreter 125 may repeat this process until the operational aspect has been transmitted. Those skilled in the art will recognize that, in most cases, time limits for high-priority operational aspects will be relatively short compared with low-priority operational aspects. Accordingly, high-priority operational aspects will cycle through each communication method more quickly, to ensure that the high-priority operational aspects are transmitted quickly via the most cost-effective communication method available.

According to one exemplary embodiment, data interpreter 125 may include adaptive software configured to analyze historical statistics associated with each communication method. For example, data interpreter 125 and/or software associated therewith may independently determine the most reliable and/or cost effective communication method for the particular machine. Data interpreter 125 may establish this communication method as the default communication method. By establishing a default communication method, data interpreter 125 may reduce the time that high-priority data remains in the communication queue by disqualifying communication methods that consistently fail to meet the time requirements associated with high-priority data. Alternatively and/or additionally, data interpreter 125 may establish a minimum reliability threshold for high-priority data, such that only those communication methods with reliability greater than a minimum reliability threshold will be used for high-priority data communication.

Industrial Applicability

Although the disclosed embodiments are described in connection with a work environment involving a plurality of machines operating in a commercial or industrial job-site, they may be applicable to any project environment where it may be advantageous to monitor a plurality of remote assets.

Specifically, the systems and methods described herein provide a strategic solution for cost effectively and reliably collecting and distributing data in project environments based on the criticality of the data.

The presently disclosed system for strategic management and communication of data in machine environments may have several advantages. First, the system described herein may be configured to prioritize operation data and establish a communication strategy that queues high-priority operation data for transmission before low-priority data. As a result, the presently disclosed system provides organizations that rely on receiving critical operation data as quickly as possible with a solution for analyzing operation data, separating the critical operation data from the non-critical operation data, and selecting the least expensive communication method with the reliability required to provide the critical data to the organization efficiently and cost effectively.

In addition, the systems and methods described herein may be more reliable than conventional communication systems that simply transmit data using first in, first out (FIFO) data communication processes. For example, by prioritizing operation data, the presently disclosed system may limit the communication of irrelevant or unnecessary information to inexpensive communication methods, limiting the costs associated with communicating low-priority data. As a result, should one or more network connections become unavailable or unreasonably expensive, the presently disclosed system may be configured to ensure that any available communication resources are dedicated to the transmission of highly critical operation data.

It will be apparent to those skilled in the art that various modifications and variations can be made to the presently disclosed system for strategic management and communication of data in machine environments. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for strategic management and communication of data in machine environments comprising:
   at least one communication module for communicating data with an off-board system, the communication module being disposed in a machine environment and adapted for use with one or more communication methods;
   a data interpreter communicatively coupled to the at least one communication module and configured to:
     communicate operation data associated with a machine, the operation data including a plurality of operational aspects associated with at least a portion of the machine;
     prioritize each of the plurality of operational aspects in a communication queue associated with the data interpreter;
     select a communication method for each of the plurality of operational aspects based on a priority associated with a respective operational aspect; and
     transmit each of the operational aspects to the off-board system via the selected communication method, where prioritizing each of the plurality of operational aspects includes:
       analyzing each operational aspect based on predetermined operational criteria, including;
       comparing a value of at least one operational aspect to a predetermined threshold;
       designating one or more operational aspects whose value does not conform with the predetermined threshold as high-priority; and
       designating one or more operational aspects whose value does conform with the predetermined threshold as low-priority; and
     establishing data communication time limits for one or more operational aspects based on the priority associated with the one or more operational aspects,
     wherein a data communication time limit established for the one or more high-priority operational aspects is shorter than a data communication time limit established for the one or more low-priority operational aspects and
     wherein selecting the communication method includes:
       receiving a list of available communication methods from the off-board system, the list including cost data associated with each available communication method;
       selecting the least costly communication method available;
       monitoring a time that an operational aspect remains in the queue; and
       selecting a second communication method from the list of available communication methods if the monitored time exceeds the data communication time limit, wherein the data communication time limit is indicative of a time period that the operational aspect is permitted to remain in the queue.

2. The system of claim 1, wherein the at least one communication module includes one or more of a satellite, cellular, short message service, smartcard, or global navigational communication module configured to communicate data via a communication network.

3. The system of claim 2, wherein the communication module is communicatively coupled to a global navigational satellite system network adapted to collect location information associated with the machine and provide the location information to the at least one communication module.

4. The system of claim 1, wherein the at least one communication module includes a communication module that supports data communication via satellite, cellular, and short message service communication networks.

5. The system of claim 1, further including a plurality of monitoring devices communicatively coupled to the data interpreter, each of the monitoring devices configured to:
   monitor an operational aspect associated with the machine; and
   provide data indicative of the monitored operational aspect to the data interpreter.

6. The system of claim 1, wherein selecting the at least one communication method includes:
   detecting a plurality of available communication methods;
   assigning a communication method to each of the plurality of operation aspects in the communication queue such that high-priority operational aspects are queued for transmission based on reliability of the available communication method and low-priority operational aspects are queued for transmission based on cost of the available communication method.

7. The system of claim 6, wherein the data interpreter is further configured to:

query a communication server for a list of available communication methods;
receive the list of available communication methods in response to the request, wherein the list of available communication methods includes cost and reliability data associated with each available communication method.

8. The system of claim 1, wherein the off-board system is configured to:
monitor a location of the machine;
identify available communication methods based on the location of the machine;
determine cost and reliability data associated with the available communication methods based on the location of the machine; and
provide a table that includes a list of the available communication methods, the list including cost and reliability data associated with each of the available communication methods.

9. The system of claim 8, wherein selecting the communication method further includes:
providing data indicative of the location of the machine to the off-board system;
receiving the cost and reliability information associated with available communication methods from the off-board system;
wherein the cost and reliability data is based on the location of the machine.

10. The system of claim 1, wherein:
the data interpreter is configured to determine whether each operational aspect is transmitted to the off-board system via the selected communication method within a respective data communication limit, and
to select another communication method for one or more operational aspects if the one or more operational aspects are not transmitted to the off-board system within their respective established data communication limits.

11. The system of claim 1, wherein prioritizing each of the plurality of operational aspects further includes:
arranging the one or more high-priority operational aspects in the queue based on an actual amount of time that the one or more high-priority operational aspects have been in the queue,
wherein, if the actual amount of time associated with a first high-priority operational aspect is greater than the actual amount of time associated with a second high-priority operational aspect, the first high-priority operational aspect is arranged in the queue for transmission to the off-board system before the second high-priority operational aspect.

12. The system of claim 1, wherein prioritizing each of the plurality of operational aspects further includes:
designating one or more operational aspects as high-priority without regard to the value of the one or more operational aspects.

13. The system of claim 1, wherein at least one operational aspect is associated with a unique tracking identification code, and
the data interpreter is configured to determine, using the unique tracking identification code, whether the at least one operational aspect associated with the unique tracking identification code has been successfully received by the off-board system.

14. A method for data communication between one or more geographically dispersed assets and a project management system comprising:
receiving, in a data interpreter, operation data associated with a remote asset operating in a project environment, the operation data including a plurality of operational aspects associated with the remote asset;
assigning, by the data interpreter, a priority to each of the plurality of operational aspects;
arranging the plurality of operational aspects in a communication queue based on the assigned priority associated with the plurality of operational aspects;
selecting, by the data interpreter, a communication method for each of the plurality of operational aspects in the communication queue; and
transmitting data from the communication queue via the selected communication method, wherein assigning a priority to each of the plurality of operational aspects includes:
analyzing, by the data interpreter, the received operational aspects based on predetermined operational criteria, including:
comparing a value of at least one operational aspect to a predetermined threshold;
designating, by the data interpreter, one or more operational aspects whose value does not conform with the predetermined threshold as high-priority; and
designating, by the data interpreter, one or more operational aspects whose value does conform with the predetermined threshold as low-priority, and
establishing data communication time limits for one or more operational aspects based on the priority associated with the one or more operational aspects,
wherein a data communication time limit established for the one or more high-priority operational aspects is shorter than a data communication time limit established for the one or more low-priority operational aspects and
wherein selecting the communication method includes:
receiving a list of available communication methods from the off-board system, the list including cost data associated with each available communication method:
selecting the least costly communication method available;
monitoring a time that an operational aspect remains in the queue; and
selecting a second communication method from the list of available communication methods if the monitored time exceeds the data communication time limit, wherein the data communication time limit is indicative of a time period that the operational aspect is permitted to remain in the queue.

15. The method of claim 14, wherein selecting the communication method includes:
identifying at least one available communication method based on a location of the remote asset;
determining a cost and reliability associated with the at least one available communication method; and
assigning a communication method to each of the plurality of operation aspects in the communication queue such that high-priority operational aspects are queued for transmission based on the reliability of the available communication methods and low-priority operational aspects are queued for transmission based on the cost of the available communication methods.

16. The method of claim 15, wherein selecting a communication method for transmitting operation data stored in the communication queue includes:
- analyzing a plurality of communication methods based on one or more of reliability and cost associated with each of the plurality of available communication methods;
- selecting, for high priority operational aspects, a communication method as an available communication method with a reliability factor that exceeds a predetermined reliability threshold; and
- selecting, for low priority operational aspects, a communication method as an available communication method with a cost less than a predetermined cost threshold.

17. The method of claim 16, wherein selecting the communication method for high-priority operational aspects includes:
- selecting the communication method with the highest reliability factor of the available communication methods; and
- selecting the communication method for low-priority operational aspects includes selecting the communication method with the lowest cost of the available communication methods.

18. The method of claim 14, wherein the predetermined threshold is a design specification value or range for a system of the remote asset.

19. The method of claim 18, wherein the design specification value or range relates to at least one of a stress-strain threshold, a mechanical force limit, fuel efficiency, an operating temperature, an operating pressure, or a load limit.

20. The method of claim 14, wherein the predetermined threshold is a value or range related to at least one of a combustion engine, a motor, a transmission, a fluid cooling system, a generator, a cooling tank, or a lubricating fluid, of the remote asset.

21. The method of claim 14, wherein the predetermined threshold is a value or range of at least one of a fuel level, an oil pressure, an engine temperature, a coolant flow rate, a coolant temperature, a tire pressure, an engine temperature, a load, or a fuel efficiency, of the remote asset.

22. A method for data communication between one or more geographically dispersed assets and a project management system comprising:
- monitoring operation data associated with a remote asset operating in a project environment, wherein the operation data is indicative of a plurality of operational aspects associated with the remote asset;
- prioritizing the operation data;
- establishing a communication queue for communicating the operation data between a remote asset and a project management system, the communication queue being configured to arrange the operation data for communication based on a priority associated with each respective operational aspect operation data;
- selecting a communication method for transmitting the operation data in the communication queue such that operation data is queued for transmission based on one or more of reliability and cost of available communication methods; and
- transmitting operation data associated with the communication queue via a selected communication method, where prioritizing the operation data includes:
  - analyzing each operational aspect based on predetermined operational criteria, including:
    - comparing a value of at least one operational aspect to a predetermined threshold, wherein the predetermined threshold is a design specification value or range for a combustion engine, a motor, a transmission, a fluid cooling system, a generator, a cooling tank, or a lubricating fluid, of the remote asset;
  - designating one or more operational aspects whose value does not conform with the predetermined threshold as high-priority; and
  - designating one or more operational aspects whose value does conform with the predetermined threshold as low-priority; and
  - establishing data communication time limits for one or more operational aspects based on the priority associated with the one or more operational aspects,
  - wherein a data communication time limit established for the one or more high-priority operational aspects is shorter than a data communication time limit established for the one or more low-priority operational aspects; and
  - wherein selecting the communication method includes:
    - receiving a list of available communication methods from an off-board system, the list including cost data associated with each available communication method;
    - selecting the least costly communication method available;
    - monitoring a time that an operational aspect remains in the queue; and
    - selecting a second communication method from the list of available communication methods if the monitored time exceeds the data communication time limit, wherein the data communication time limit is indicative of a time period that the operational aspect is permitted to remain in the queue.

23. The method of claim 22, wherein selecting a communication method for transmitting operation data stored in the communication queue includes:
- analyzing a plurality of communication methods based on one or more of reliability and cost associated with each of the plurality of available communication methods;
- selecting, for high priority operation data, a communication method as an available communication method with a reliability factor that exceeds a predetermined reliability threshold; and
- selecting, for low priority operation data, a communication method as an available communication method with a cost less than a predetermined cost threshold.

24. A method for data communication between one or more geographically dispersed assets and a project management system comprising:
- receiving, in a data interpreter, operation data associated with a remote asset operating in a project environment, the operation data including a plurality of operational aspects associated with the remote asset;
- assigning a priority to each of the plurality of operational aspects;
- arranging the plurality of operational aspects in a communication queue based on the assigned priority associated with the plurality of operational aspects;
- establishing a data communication time limit for each of the plurality of operational aspects based on the priority assigned to each of the plurality of operational aspects, wherein the established data communication time limit for each of the plurality of operational aspects is indicative of a time period that each of the plurality of operational aspects is permitted to remain in the communication queue;
receiving a list of communication methods from the remote asset, the list including cost data associated with each available communication method;
initially assigning a first communication method for all of the plurality of operational aspects in the communication queue, wherein the first communication method is the least costly communication method available;
transmitting data from the communication queue via the first communication method; and
selectively reassigning one or more of the plurality of operational aspects to a different communication method based at least in part on the priority assigned to each of the plurality of operational aspects and a measured time delay associated with transmitting each of the operational aspects via the first communication method, wherein the measured time delay is indicative of a length of time that each respective operational aspect remains in the communication queue beyond its respective data communication time limit.

25. The system of claim 24, wherein establishing a data communication time limit for each of the plurality of operational aspects based on the priority assigned to each of the plurality of operational aspects further includes:
associating a first data communication time limit with at least one of the operational aspects if the at least one operational aspect is designated as high-priority; and
associating a second data communication time limit with at least one of the operational aspects if the at least one operational aspect is designated as low-priority,
wherein the first data communication time limit is shorter in duration than the second data communication time limit.

* * * * *